United States Patent
Li et al.

(10) Patent No.: US 12,400,124 B1
(45) Date of Patent: Aug. 26, 2025

(54) INCREMENTAL LEARNING METHOD AND APPARATUS FOR LARGE VISION-LANGUAGE MODEL FOR AUTONOMOUS DRIVING

(71) Applicant: Beijing University of Chemical Technology, Beijing (CN)

(72) Inventors: Zhiwei Li, Beijing (CN); Jingshuo Liu, Beijing (CN); Peiran Chen, Beijing (CN); Zihao Wu, Beijing (CN); Xintao Wu, Beijing (CN); Kunfeng Wang, Beijing (CN); Tianyu Shen, Beijing (CN); Li Wang, Beijing (CN); Qifan Tan, Beijing (CN); Wei Zhang, Beijing (CN)

(73) Assignee: Beijing University of Chemical Technology, Beijing (CN)

( * ) Notice: Subject to any disclaimer, the term of this patent is extended or adjusted under 35 U.S.C. 154(b) by 0 days.

(21) Appl. No.: 19/052,320

(22) Filed: Feb. 13, 2025

(30) Foreign Application Priority Data

Feb. 27, 2024 (CN) .......................... 202410215362.6

(51) Int. Cl.
*G06N 3/096* (2023.01)
*G06N 3/04* (2023.01)

(52) U.S. Cl.
CPC .............. *G06N 3/096* (2023.01); *G06N 3/04* (2013.01)

(58) Field of Classification Search
None
See application file for complete search history.

(56) References Cited

U.S. PATENT DOCUMENTS

| | | | |
|---|---|---|---|
| 2024/0161520 A1* | 5/2024 | Li ............................ | G06N 3/08 |
| 2024/0354642 A1* | 10/2024 | Gopalkrishna .......... | G06N 3/08 |
| 2025/0013866 A1* | 1/2025 | Zhao ....................... | G06N 3/044 |

FOREIGN PATENT DOCUMENTS

| | | |
|---|---|---|
| CN | 110287960 A | 9/2019 |
| CN | 113139602 A | 7/2021 |
| CN | 117111107 A | 11/2023 |
| CN | 117218611 A | 12/2023 |

* cited by examiner

*Primary Examiner* — Leon Flores
(74) *Attorney, Agent, or Firm* — Bayramoglu Law Offices LLC (57) ABSTRACT

An incremental learning method and apparatus for a large Vision-Language Model for autonomous driving are provided. The incremental learning method includes: expanding a first training sample set to obtain a second training sample set, wherein the second training sample set includes a plurality of image samples annotated with road scene targets; inserting a plurality of fine-tuning sub-networks respectively into specified positions in a first large Vision-Language Model to generate a second large Vision-Language Model; processing the image samples in the second training sample set using the second large Vision-Language Model to obtain a target prediction result; calculating a loss value using the target prediction result and a target annotation result; and preserving parameters of the first large Vision-Language Model unchanged, and updating parameters of the fine-tuning sub-networks using the loss value.

19 Claims, 5 Drawing Sheets

INCREMENTAL LEARNING METHOD AND APPARATUS FOR LARGE VISION-LANGUAGE MODEL FOR AUTONOMOUS DRIVING

CROSS REFERENCE TO THE RELATED APPLICATIONS

This application is based upon and claims priority to Chinese Patent Application No. 202410215362.6, filed on Feb. 27, 2024, the entire contents of which are incorporated herein by reference.

TECHNICAL FIELD

The present application relates to the technical field of autonomous driving, and in particular to an incremental learning method and apparatus for a large Vision-Language Model for autonomous driving.

BACKGROUND

In autonomous driving, there is a high requirement on real-time and efficient performance of perception systems. Therefore, researchers face an urgent need to efficiently fine-tune large models within limited time and with limited computational resources to adapt to new driving scenarios and traffic conditions.

In the current field of large models, a "pre-training+fine-tuning" learning paradigm is widely applied. However, the traditional pre-training+fine-tuning paradigm has two common drawbacks: first, as model parameters continue to grow, the computational burden of full fine-tuning becomes excessive; second, catastrophic forgetting occurs, where performance on old tasks significantly declines after training on a new task.

Existing efficient fine-tuning methods that update part of parameters include Adapter and Prefix-tuning. The Adapter method uses a serial structure, and inserted Adapter modules can easily become a computational bottleneck, especially when the degree of parallelism is low (with small batch sizes or short sequence lengths), which significantly impacts the computational efficiency of the model. The Prefix-tuning method uses a parallel structure, but introduced prefix tokens occupy the model's available input length, resulting in poor scalability of Prefix-tuning. Increasing the number of parameters inevitably increases the number of prefix tokens, which exacerbates the occupation of the SoftMax model's available input length.

SUMMARY

In view of this, the present application provides an incremental learning method and apparatus for a large Vision-Language Model for autonomous driving to solve the technical problems described above.

In a first aspect, embodiments of the present application provide an incremental learning method for a large Vision-Language Model for autonomous driving, including:
  expanding a first training sample set to obtain a second training sample set, wherein the second training sample set includes a plurality of image samples annotated with road scene targets;
  inserting a plurality of fine-tuning sub-networks respectively into specified positions in a first large Vision-Language Model to generate a second large Vision-Language Model;
  processing the image samples in the second training sample set using the second large Vision-Language Model to obtain a target prediction result;
  calculating a loss value using the target prediction result and a target annotation result; and
  preserving parameters of the first large Vision-Language Model unchanged, and updating parameters of the fine-tuning sub-networks using the loss value.

Further, expanding a first training sample set to obtain a second training sample set includes:
  acquiring a first image sample that includes a preset category from the first training sample set;
  processing the first image sample using a generative model to obtain a plurality of second image samples that include the preset category, the second image samples being different from the first image sample;
  annotating preset category targets in the plurality of second image samples that include the preset category; and
  forming the second training sample set by all the annotated second image samples.

Further, each fine-tuning sub-network includes a first parameterized hyper-complex multiplication layer, a normalization layer, a second parameterized hyper-complex multiplication layer, and a scaling unit, which are connected sequentially, wherein the normalization layer uses a softmax function; and the scaling unit is used to scale an output result from the second parameterized hyper-complex multiplication layer using a preset parameter.

Further, the first large Vision-Language Model includes a plurality of first Transformer units, each of which includes an encoder and a first decoder, the first decoder including: a multi-head attention layer, a first addition and normalization layer, a feed-forward layer, and a second addition and normalization layer; and
  inserting a plurality of fine-tuning sub-networks respectively into specified positions in a first large Vision-Language Model to generate a second large Vision-Language Model includes:
  adding a parallel fine-tuning sub-network for the multi-head attention layer of the first decoder of each Transformer unit of the first large Vision-Language Model; and
  adding a parallel fine-tuning sub-network for the feed-forward layer of the first decoder of each Transformer unit of the first large Vision-Language Model.

Further, the second large Vision-Language Model includes a plurality of second Transformer units, each of which includes an encoder and a second decoder, the second decoder including: a multi-head attention layer, a first fine-tuning sub-network, a first addition and normalization layer, a feed-forward layer, a second fine-tuning sub-network, and a second addition and normalization layer; input data to the second Transformer unit enters the multi-head attention layer, the first fine-tuning sub-network, and the first addition and normalization layer, respectively; an output result from the first fine-tuning sub-network enters the first addition and normalization layer; an output result from the first addition and normalization layer enters the feed-forward layer, the second fine-tuning sub-network, and the second addition and normalization layer; and an output result from the second fine-tuning sub-network enters the second addition and normalization layer.

Further, the method further includes:
  acquiring first text information entered by a user;
  determining a target category of a to-be-detected image from the center of the first text information;

generating a question based on the target category, the question including a specific description of the target category;

acquiring second text information entered by the user for the question; and using the second text information as an input to the large Vision-Language Model.

In a second aspect, embodiments of the present application provide an incremental learning apparatus for a large Vision-Language Model for autonomous driving, including:

a first processing unit configured to expand a first training sample set to obtain a second training sample set, wherein the second training sample set includes a plurality of image samples annotated with road scene targets;

a generation unit configured to insert a plurality of fine-tuning sub-networks respectively into specified positions in a first large Vision-Language Model to generate a second large Vision-Language Model;

a second processing unit configured to process the image samples in the second training sample set using the second large Vision-Language Model to obtain a target prediction result;

a calculation unit configured to calculate a loss value using the target prediction result and a target annotation result; and a fine-tuning unit configured to preserve parameters of the first large Vision-Language Model unchanged, and update parameters of the fine-tuning sub-networks using the loss value.

In a third aspect, embodiments of the present application provide an electronic device, including a processor, a memory, and a computer program stored in the memory and executable on the processor, wherein when executing the computer program, the processor implements the method in embodiments of the present application.

In a fourth aspect, embodiments of the present application provide a computer readable storage medium, wherein the computer readable storage medium stores computer instructions which, when executed by a processor, implements the method in embodiments of the present application.

While ensuring that parameters of an original model remain unchanged, the method of the present application reduces the cost of training and storing parameters, enabling efficient fine-tuning of a large model with a small number of samples.

BRIEF DESCRIPTION OF THE DRAWINGS

To describe technical solutions in specific embodiments of the present application or in the prior art more clearly, a brief introduction to drawings for use in description of the specific embodiments or the prior art will be provided below. Obviously, the drawings described below represent some implementations of the present application, and for those of ordinary skill in the art, other drawings may also be obtained based on the drawings without creative work.

DETAILED DESCRIPTION OF THE EMBODIMENTS

To make the objects, technical solutions and advantages of embodiments of the present application more explicit, technical solutions in embodiments of the present application will be described below clearly and thoroughly in conjunction with drawings in embodiments of the present application. Evidently, the described embodiments represent part of, but not all of, embodiments of the present application. Components in embodiments of the present application, as generally described and shown in the drawings here, can be arranged and designed in a variety of different configurations.

Therefore, the following detailed description of embodiments of the present application provided in the drawings is not intended to limit the scope of the present application as claimed, but merely represents selected embodiments of the present application. Based on embodiments in the present application, all other embodiments obtained by those of ordinary skill in the art without creative work, fall within the scope of protection of the present application.

A brief introduction to design ideas of embodiments of the present application is provided first.

In autonomous driving, there is a high requirement on real-time and efficient performance of perception systems. Therefore, researchers face an urgent need to efficiently fine-tune large models within limited time and with limited computational resources to adapt to new driving scenarios and traffic conditions. However, in real-world scenarios, there are often only a limited number of samples available for model training, making few-shot learning particularly important. Moreover, with the development of deep learning models, increasingly complex large models have emerged. As a result, researchers face an urgent need to efficiently fine-tune large models within limited time and with limited computational resources to adapt to new driving scenarios and traffic conditions. The training and fine-tuning of the large models usually require a large amount of data and resources, and the increase in the number of parameters also affects the real-time and efficient performance of autonomous driving systems.

In the current field of large models, a "pre-training+fine-tuning" learning paradigm is widely applied. However, the traditional pre-training+fine-tuning paradigm has two common drawbacks: first, as model parameters continue to grow, the computational burden of full fine-tuning becomes excessive; second, catastrophic forgetting occurs, where performance on old tasks significantly declines after training on a new task. Therefore, to solve the two problems, efficient fine-tuning methods for large models with few samples and few parameters are particularly important.

Existing efficient fine-tuning methods that update part of parameters include Adapter and Prefix-tuning. Adapter technology (adapter) is a training method that allows a model to be applied to downstream tasks without changing parameters of the pre-trained model itself. Its main idea is to freeze the parameters of the original model and insert projection layers with few parameters between frozen layers. During training, a forward propagation process uses all the parameters of the original model and the projection layers, thus fully leveraging knowledge of the pre-trained model itself; and in a back propagation process, only the parameters of the projection layers are updated, which not only speeds up training, but also preserves the original model unchanged. However, the Adapter method uses a serial structure, and inserted adapter modules can easily become a computational bottleneck, especially when the degree of parallelism is low (with small batch sizes or short sequence lengths), which significantly impacts the computational efficiency of the model. The Prefix-tuning method uses a parallel structure, but introduced prefix tokens occupy the model's available input length, resulting in poor scalability of Prefix-tuning. Increasing the number of parameters inevitably increases the number of prefix tokens, which exacerbates the occupation of the SoftMax model's available input length.

There are many existing Prompt methods, such as those that model the prompt context based on learnable vectors, and those that generate prompts based on a large language model. In methods that model the prompt context based on learnable vectors, these vectors can be optimized by minimizing classification loss. Methods that generate prompts based on a large language model can facilitate iteration and optimization: with the assistance of the large language model, a user can quickly iterate and optimize prompt versions, evaluate their effects, and select an optimal template, thereby achieving optimization with ease. Moreover, such methods offer greater adaptability: the large language model can learn and master prompt-writing techniques for different domains and tasks, easily adapting to new requirements.

The technical solutions of the present application adopt a parallel structure and provide sufficient scalability. In addition, an automatic prompt generation method is used to improve a detection effect. Compared with the Adapter fine-tuning method, prompt-based fine-tuning is non-intrusive, and can achieve model optimization without the need to add parameters.

The present application has the following advantages: while ensuring that parameters of an original model remain unchanged, it reduces the cost of training and storing parameters, enabling efficient fine-tuning of a large model with a small number of samples; while preserving original parameter performance of the original model unchanged, a small number of samples are used and a small number of new parameters are added to achieve the effect of efficient fine-tuning.

After introduction to the application scenarios and design ideas of embodiments of the present application, the technical solutions provided in embodiments of the present application are described below.

Figure 1:
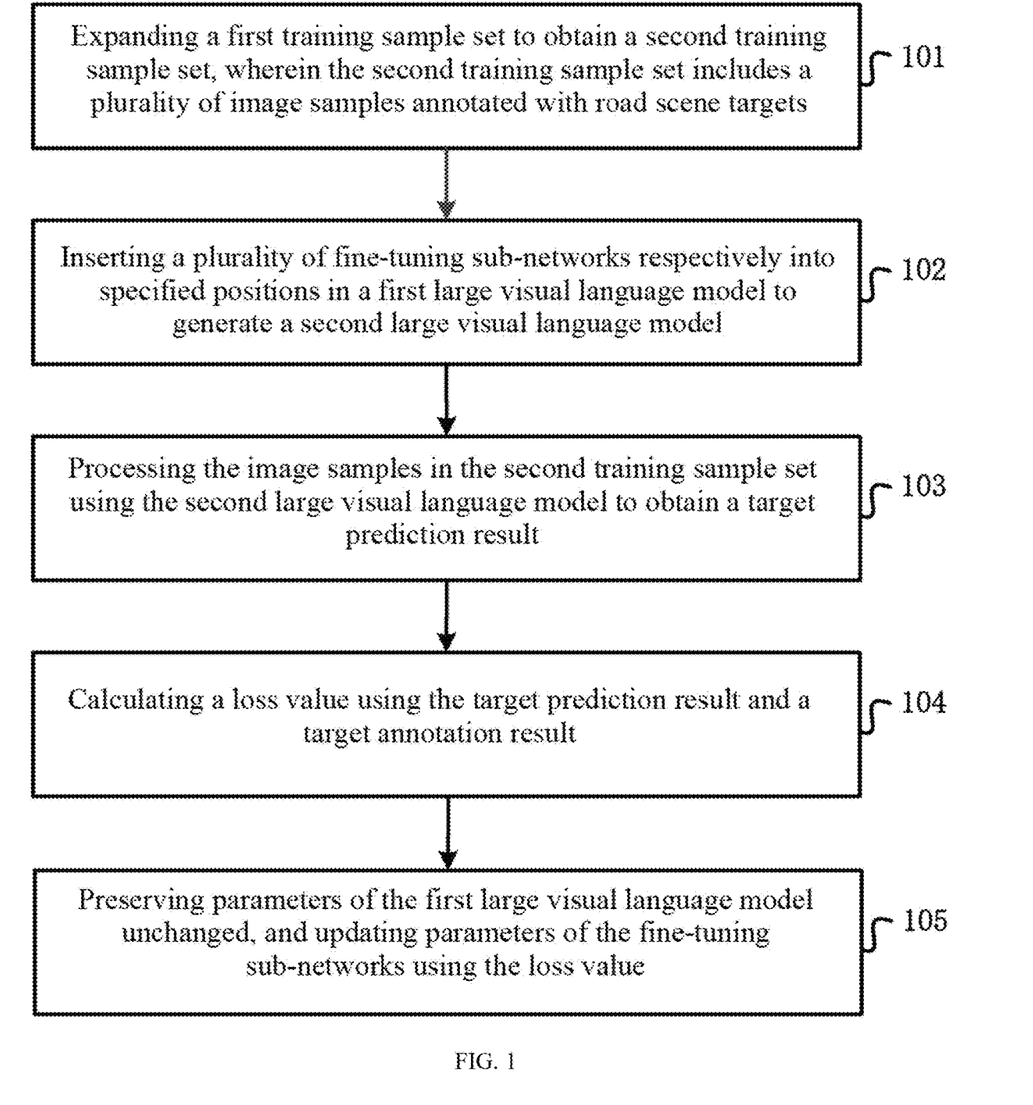
FIG. 1 is a flow diagram of an incremental learning method for a large Vision-Language Model for autonomous driving provided in embodiments of the present application.

As shown in FIG. 1, embodiments of the present application provide an incremental learning method for a large Vision-Language Model for autonomous driving, including:

Step 101: expanding a first training sample set to obtain a second training sample set, wherein the second training sample set includes a plurality of image samples annotated with road scene targets;

In real-world autonomous driving scenarios, rare categories (e.g., tanks and animals) often have only limited samples available for model training, making few-shot learning particularly important. The present application uses a method of constructing a support set to accomplish few-shot incremental learning. An expansion set is constructed by using a method of generating an image expansion dataset using a generative model, which is Stable Diffusion. Stable Diffusion is trained using 512×512 images from a subset of a LAION-5B database. The architecture of Stable Diffusion mainly includes an encoder, a decoder and a diffusion module. The encoder transforms an input image into latent variables, wherein the input is a text string, and the output is a series of semantic vectors with input text information. With the semantic vectors, it can serve as a control input for a subsequent image generator. The decoder restores the latent variables into an image, and the diffusion module is responsible for gradually adding noise and generating an image.

Category labels are input into Stable Diffusion. Stable Diffusion generates images based on the manually input labels. After a certain number of expanded images are generated, manual annotation is performed to create an expansion set for few-shot data. Finally, the few-shot dataset and the expansion set are combined and undergo uniform preprocessing (screening and resizing the images to the same size) to form a final dataset.

Specifically, expanding a first training sample set to obtain a second training sample set includes:
  acquiring a first image sample that includes a preset category from the first training sample set;
  processing the first image sample using a generative model to obtain a plurality of second image samples that include the preset category, the second image samples being different from the first image sample;
  annotating preset category targets in the plurality of second image samples that
  include the preset category; and
  forming the second training sample set by all the annotated second image samples.

Exemplarily, preset categories include: vehicles, tanks, bicycles, electric vehicles, etc.

Figure 2:
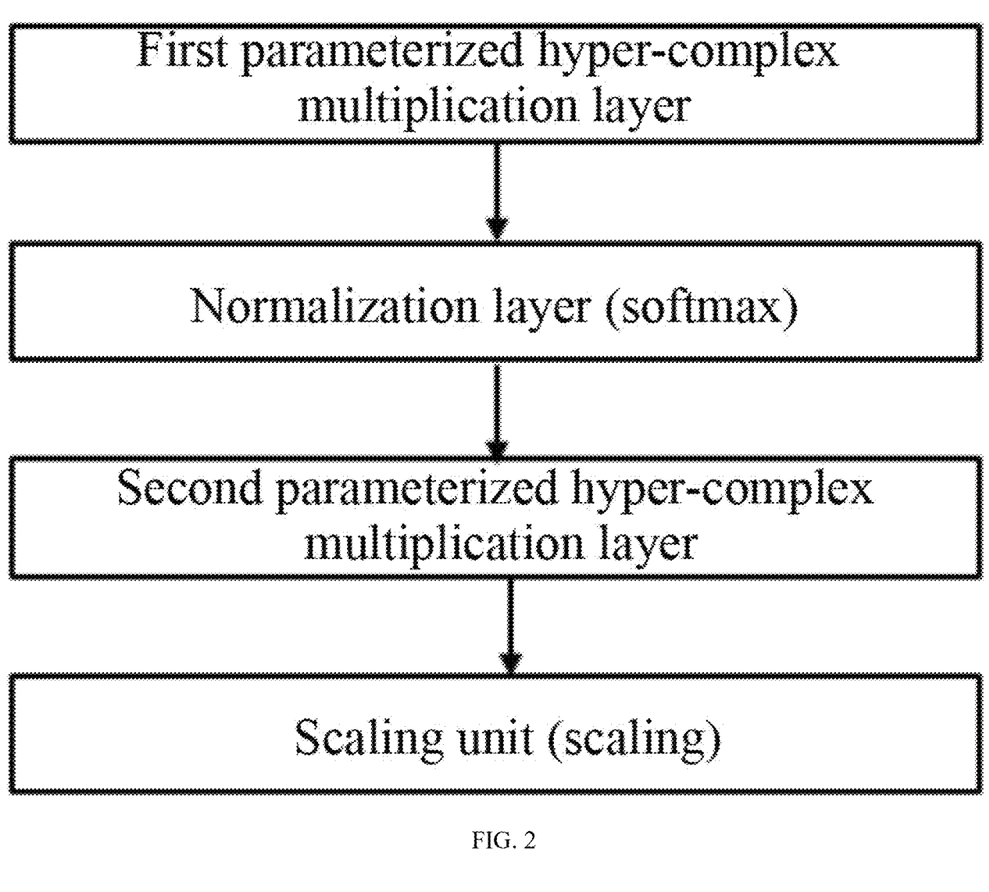
FIG. 2 is a schematic structure diagram of a fine-tuning subnetwork provided in embodiments of the present application.

Step 102: inserting a plurality of fine-tuning sub-networks respectively into specified positions in a first large Vision-Language Model to generate a second large Vision-Language Model;

In this embodiment, each fine-tuning sub-network is a fine-tuning component PPAdapter (Parameterized Hypercomplex Multiplication and Parallel Adapter). The PPAdapter is an adapter applied to a Transformer Decoder and includes four parts: a first PHM (Parameterized Hypercomplex Multiplication) layer, a softmax activation function, a second PHM layer, and a scaling unit.

The PPAdapter component has the advantage that it does not require updating parameters of a pre-trained model, and it can learn a task well by adding only a minimal number of new parameters. The first PHM layer takes an output from the Transformer block as an input and projects an original input dimension d to m. By controlling the size of m, the number of parameters of the PPAdapter can be constrained. Typically, m is much smaller than d. In an output stage, a second feed-forward sublayer restores the input dimension by projecting m back to d, and the scaling unit performs scaling to produce an output of the PPAdapter.

Parameterized hypercomplex multiplication allows the model to learn multiplication rules from data, regardless of whether these rules are predefined. Thus, parameterized hypercomplex multiplication not only encompasses a Hamilton product, but also learns to operate on arbitrary hypercomplex spaces. The key idea behind the PHM layer is to learn interactions between real and imaginary components, i.e., to learn multiplication rules from data that involve a sum of Kronecker products, and by using arbitrary 1/n learnable parameters, it provides greater architectural flexibility than a fully connected layer approach. Its formula is as follows:

$$y = PHM(x) = Hx + b$$

For the context, a Kronecker product is a generalization of a vector outer product to higher dimensions in a real space. The parameter H is a sum of n Kronecker products. The PHM layer not only can reduce the number of parameters, but also can improve the performance by flexibly choosing n. The parameter b is a bias vector.

Softmax is an activation function commonly used in multi-category classification. It converts a set of numerical values into probability values that represent a probability distribution. A softmax classifier may be understood as a generalization of a logistic regression classifier for multi-category classification. Softmax is used in a multi-category classification process. It maps outputs of multiple neurons to the (0, 1) interval, which may be interpreted as probabilities to perform multi-category classification.

After the first PHM layer, the softmax activation function and the second PHM layer, an additional scaling factor is introduced to apply PP-adapter weights to pre-trained weights during forward propagation.

This embodiment integrates the PPAdapter into the decoder of each Transformer unit, and ultimately integrates it into appropriate positions in the large Vision-Language Model to achieve an efficient fine-tuning effect with few parameters.

As shown in FIG. 2, each fine-tuning sub-network includes a first parameterized hyper-complex multiplication layer, a normalization layer, a second parameterized hyper-complex multiplication layer, and a scaling unit, which are connected sequentially, wherein the normalization layer uses a softmax function; and the scaling unit is used to scale an output result from the second parameterized hyper-complex multiplication layer using a preset parameter.

The first large Vision-Language Model includes a plurality of first Transformer units, each of which includes an encoder and a first decoder, the first decoder including: a multi-head attention layer, a first addition and normalization layer, a feed-forward layer, and a second addition and normalization layer; and
  inserting a plurality of fine-tuning sub-networks respectively into specified positions in a first large Vision-Language Model to generate a second large Vision-Language Model includes:
  adding a parallel fine-tuning sub-network for the multi-head attention layer of the first decoder of each Transformer unit of the first large Vision-Language Model; and
  adding a parallel fine-tuning sub-network for the feed-forward layer of the first decoder of each Transformer unit of the first large Vision-Language Model.

Figure 3:
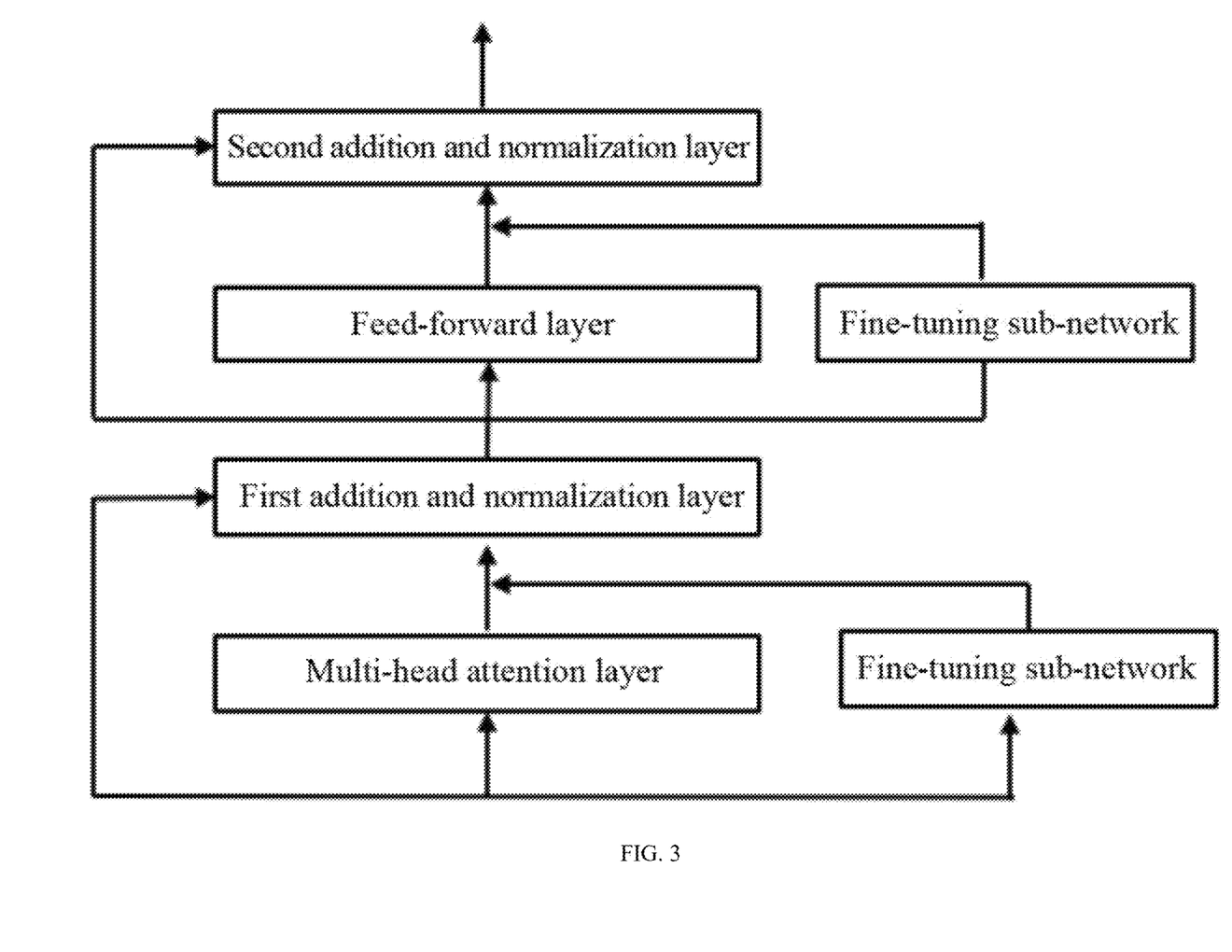
FIG. 3 is a schematic structure diagram of a second Transformer unit provided in embodiments of the present application.

Step 103: processing the image samples in the second training sample set using the second large Vision-Language Model to obtain a target prediction result;

The second large Vision-Language Model includes a plurality of second Transformer units, each of which includes an encoder and a second decoder, the second decoder including: a multi-head attention layer, a first fine-tuning sub-network, a first addition and normalization layer, a feed-forward layer, a second fine-tuning sub-network, and a second addition and normalization layer; input data to the second Transformer unit enters the multi-head attention layer, the first fine-tuning sub-network, and the first addition and normalization layer, respectively; an output result from the first fine-tuning sub-network enters the first addition and normalization layer; an output result from the first addition and normalization layer enters the feed-forward layer, the second fine-tuning sub-network, and the second addition and normalization layer; and an output result from the second fine-tuning sub-network enters the second addition and normalization layer. The structure of the second Transformer unit is shown in FIG. 3.

Step 104: calculating a loss value using the target prediction result and a target annotation result; exemplarily, the target prediction result is a predicted bounding box, and the target annotation result is a target ground-truth box.

Step 105: preserving parameters of the first large Vision-Language Model unchanged, and updating parameters of the fine-tuning sub-networks using the loss value.

Exemplarily, the parameters of the fine-tuning sub-network include: a weight of the first PHM layer and a weight of the second PHM layer.

In some embodiments, the method further includes:
  acquiring first text information entered by a user;
  determining a target category of a to-be-detected image from the center of the first text information;
  generating a question based on the target category, the question including a specific description of the target category;
  acquiring second text information entered by the user for the question; and
  using the second text information as an input to the large Vision-Language Model.

Unlike the insert-based fine-tuning method of Adapter, prompt-based fine-tuning is non-intrusive, and can achieve model optimization without the need to add parameters. Manually entering prompts for each image to be inferred is clearly unreasonable. Therefore, the present application employs a method of generating prompts using a large language model LLaVA, for example:
  the following text is passed into LLaVA: "The user input is: "user input", then what is the target category that the user wants to detect?", and an output category label can be obtained, and the category label is XX required for the next step;
  LLaVA is guided to output a prompt by the guiding text: "how does a XX usually look like? Where it usually appears? Please output a few short words to answer";
  text information in the user's answer is used as a target prompt, which, as an input, is input to the large Vision-Language Model to optimize a target detection result.

For example, when XX is Pig, the text information in the user's answer is: fat, the color such as pink and black; when XX is Tank, the text information in the user's answer is: Like big car, has barrels, usually be green or black.

A specific implementation process of the present application is described below in conjunction with a specific application scenario.

The selected large Vision-Language Model is Grounding Dino. Grounding DINO is a model with a dual-encoder, single-decoder structure. It includes an image backbone for extracting image features, a text backbone for extracting text features, a feature enhancer for fusing image features and text features, a language-guide query selection module for query initialization, and a cross-modality decoder for bounding box prediction.

The PPAdapter in this embodiment is inserted into the Feature Enhancer module and the cross-modality decoder module. The Feature Enhancer module utilizes Deformable Self-Attention and Self-Attention to enhance image features and text features, respectively, and then utilizes image-to-text and text-to-image Cross-attention to achieve feature fusion, with the PPAdapter being added in parallel to the image-to-text and text-to-image Cross-attention parts. The structure of cross-modality decoder is a combination of Self-Attention, Image Cross-Attention, and Text Cross-Attention, with the PPAdapter being added in parallel to the two cross-attention parts. The main part of the Grounding Dino model is frozen, and only the added PPAdapter is fine-tuned.

Figure 4:
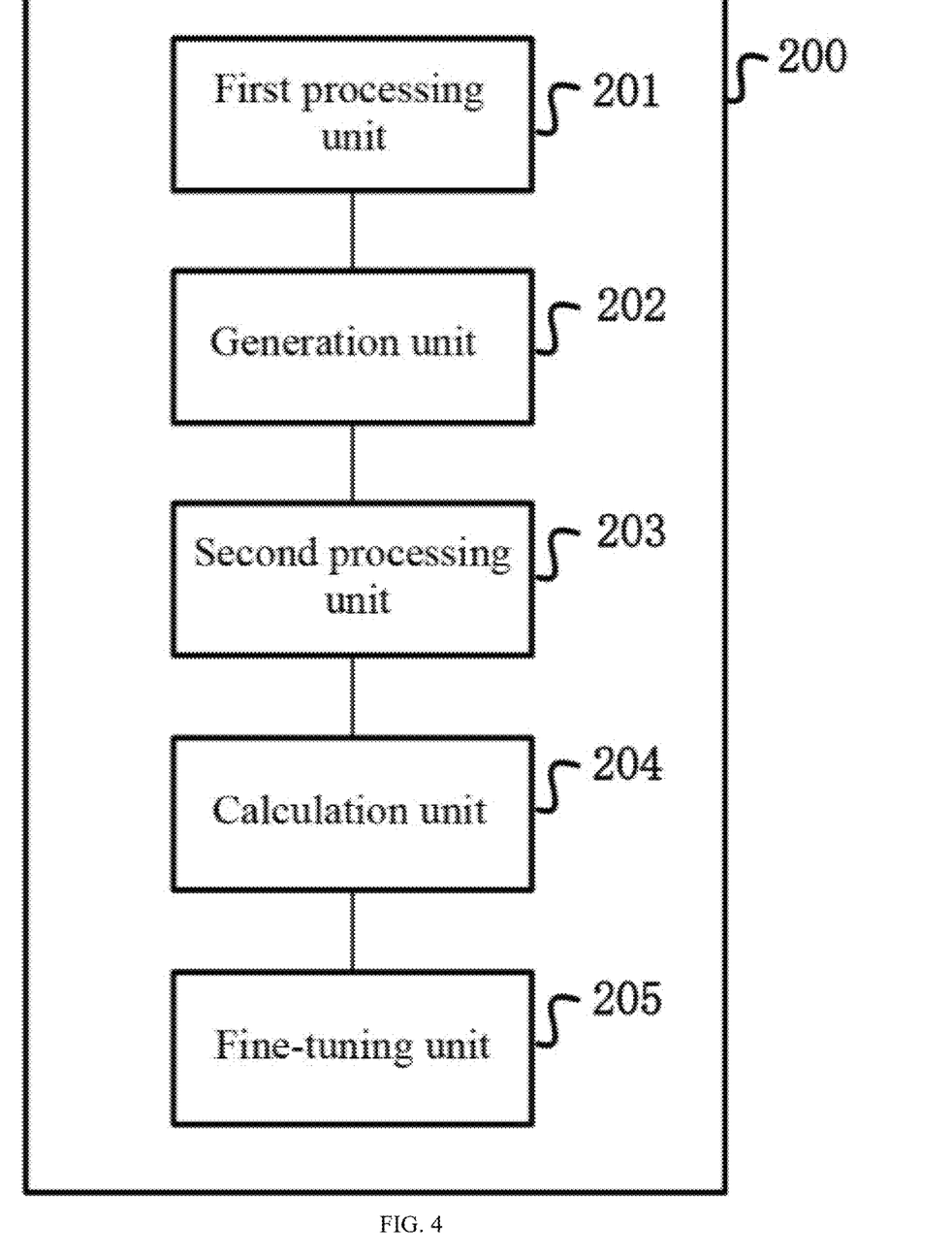
FIG. 4 is a functional structure diagram of an incremental learning apparatus for a large Vision-Language Model for autonomous driving provided in embodiments of the present application.

Based on the above embodiment, embodiments of the present application provide an incremental learning apparatus for a large Vision-Language Model for autonomous driving. Referring to FIG. 5, an incremental learning apparatus 200 of a large Vision-Language Model for autonomous driving provided in embodiments of the present application includes at least:

a first processing unit 201 configured to expand a first training sample set to obtain a second training sample set, wherein the second training sample set includes a plurality of image samples annotated with road scene targets;

a generation unit 202 configured to insert a plurality of fine-tuning sub-networks respectively into specified positions in a first large Vision-Language Model to generate a second large Vision-Language Model;

a second processing unit 203 configured to process the image samples in the second training sample set using the second large Vision-Language Model to obtain a target prediction result;

a calculation unit 204 configured to calculate a loss value using the target prediction result and a target annotation result; and a fine-tuning unit 205 configured to preserve parameters of the first large Vision-Language Model unchanged, and update parameters of the fine-tuning sub-networks using the loss value.

It should be noted that the principle by which the technical problems are solved by the incremental learning apparatus 200 of a large Vision-Language Model for autonomous driving provided in embodiments of the present application is similar to that of the method provided in embodiments of the present application. Therefore, for the implementation of the incremental learning apparatus 200 of a large Vision-Language Model for autonomous driving provided in embodiments of the present application, reference may be made to the implementation of the method provided in embodiments of the present application, and redundant details are not repeated here.

Figure 5:
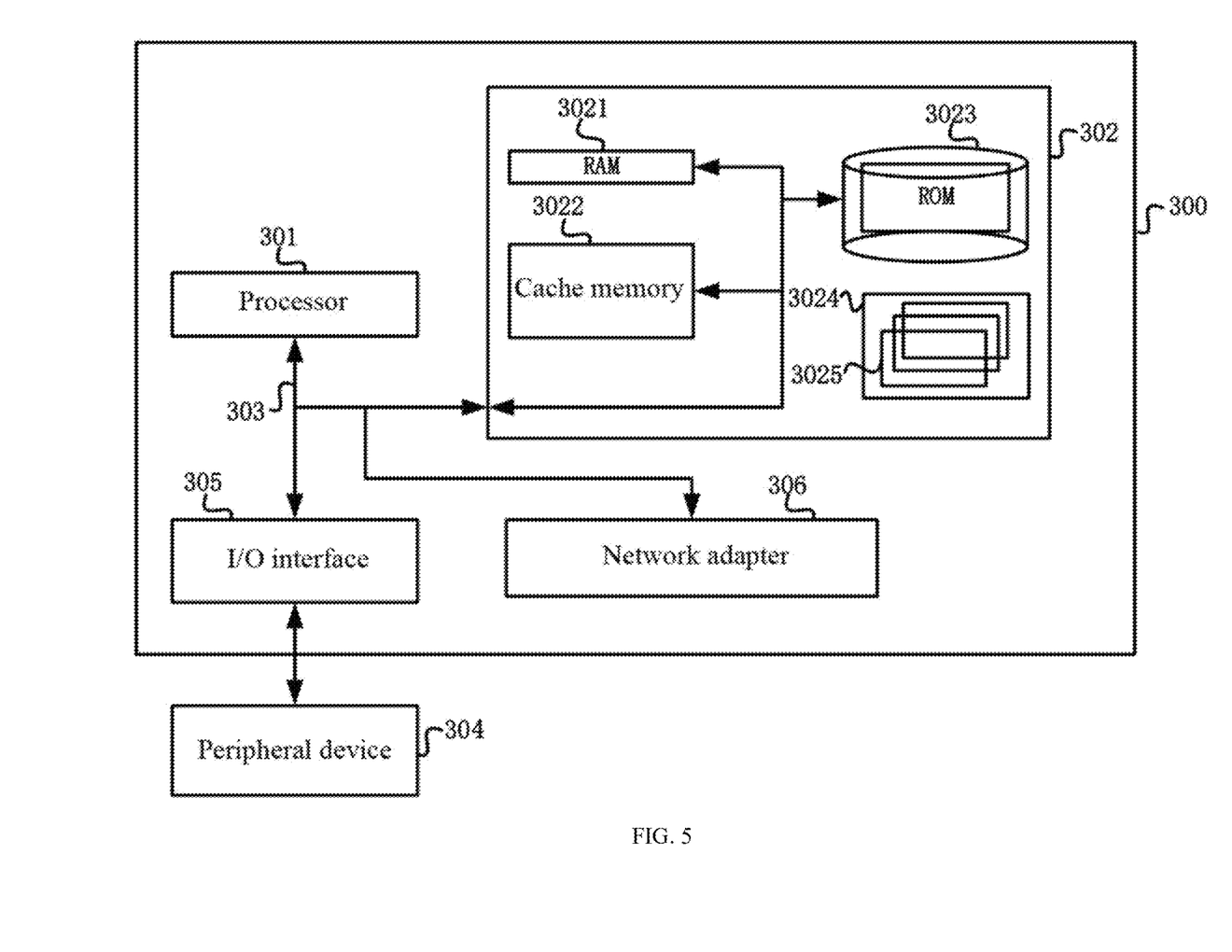
FIG. 5 is a functional structure diagram of an electronic device provided in embodiments of the present application.

Based on the above embodiment, embodiments of the present application also provide an electronic device. Referring to FIG. 5, an electronic device 300 provided in embodiments of the present application includes at least: a processor 301, a memory 302, and a computer program stored in the memory 302 and executable on the processor 301. When executing the computer program, the processor 301 implements the incremental learning method for a large Vision-Language Model for autonomous driving provided in embodiments of the present application.

The electronic device 300 provided in embodiments of the present application may also include a bus 303 connecting different components (including the processor 301 and the memory 302). The bus 303 represents one or more of several types of bus structures, including a memory bus, a peripheral bus, a local bus, etc.

The memory 302 may include a readable medium in the form of a volatile memory, such as a random access memory (RAM) 3021 and/or a cache memory 3022, and may further include a read only memory (ROM) 3023.

The memory 302 may further include a program tool 3025 with a set of (at least one) program modules 3024. The program modules 3024 include, but are not limited to, an operating subsystem, one or more application programs, other program modules, and program data. Each or some combination of the examples may include an implementation of a network environment.

The electronic device 300 may also communicate with one or more peripheral devices 304 (e.g., a keyboard, a remote control, etc.), and may also communicate with one or more devices (e.g., a mobile phone, a computer, etc.) that enable a user to interact with the electronic device 300, and/or communicate with any device (e.g., a router, a modem, etc.) that enables the electronic device 300 to communicate with one or more other electronic devices 300. Such communication may be performed through an input/output (I/O) interface 305. Furthermore, the electron device 300 may also communicate with one or more networks (e.g., a local area network (LAN), a wide area network (WAN), and/or a public network such as the Internet) through a network adapter 306. As shown in FIG. 5, the network adapter 306 communicates with other modules of the electronic device 300 through the bus 303. It should be understood that although not shown in FIG. 5, other hardware and/or software modules may be used in conjunction with the electronic device 300, including but not limited to: microcode, device drivers, redundant processors, external disk drive arrays, redundant arrays of independent disks (RAID) subsystems, tape drives, and data backup storage subsystems.

It should be noted that the electronic device 300 shown in FIG. 5 is only an example, and should not be construed as limiting the functions and scope of use of embodiments of the present application.

Embodiments of the present application also provide a computer readable storage medium. The computer readable storage medium stores computer instructions. The computer instructions, when executed by a processor, implements the incremental learning method for a large Vision-Language Model for autonomous driving provided in embodiments of the present application. Specifically, the executable program may be built-in or installed in the electronic device 300 such that the electronic device 300 may implement the incremental learning method for a large Vision-Language Model for autonomous driving provided in embodiments of the present application by executing the built-in or installed executable program.

The incremental learning method for a large Vision-Language Model for autonomous driving provided in embodiments of the present application may also be implemented as a program product, which includes a program code. When the program product is run on the electronic device 300, the program code is configured to cause the electronic device 300 to execute the incremental learning method for a large Vision-Language Model for autonomous driving provided in embodiments of the present application.

The program product provided in embodiments of the present application may be any combination of one or more readable media. Such a readable medium may be a readable signal medium or a readable storage medium. The readable storage medium may be, but is not limited to, an electronic, magnetic, optical, electromagnetic, infrared, or semiconductor system, apparatus or device, or any combination thereof. Specifically, more specific examples (a non-exhaustive list) of the readable storage medium include: an electrical connection with one or more conducting wires, a portable disk, a hard disk, a RAM, a ROM, an erasable programmable read only memory (EPROM), an optical fiber, a portable compact disc read-only memory (CD-ROM), an optical storage device, a magnetic storage device, or any suitable combination thereof.

The program product provided in embodiments of the present application may be a CD-ROM and includes a program code, and may also be run on a computing device. However, the program product provided in embodiments of the present application is not limited thereto. In embodiments of the present application, the readable storage medium may be any tangible medium containing or storing a program. The program may be used by or in combination with an instruction execution system, apparatus or device.

It should be noted that although a number of units or sub-units of the apparatus are mentioned in the detailed description above, this division is only exemplary and not mandatory. Indeed, according to implementations of the present application, features and functions of two or more of the units described above may be embodied in a single unit. Conversely, features and functions of one of the units described above may be further divided to be embodied by a plurality of units.

In addition, although the operations of the method of the present application are described in a particular order in the accompanying drawings, it is not required or implied that the operations must be performed in that particular order, or that all of the operations shown must be performed to achieve a desired result. Additionally or alternatively, certain steps may be omitted, a plurality of steps may be combined to be performed as one step, and/or one step may be broken down to be performed as a plurality of steps.

Finally, it should be noted that the above embodiments are only used for describing instead of limiting the technical solutions of the present application. Although the present application is described in detail with reference to the embodiments, those of ordinary skill in the art should understand that modifications or equivalent substitutions of the technical solutions of the present application without departing from the spirit and scope of the technical solutions of the present application should be encompassed within the scope of the claims of the present application.

What is claimed is:

1. An incremental learning method for a large Vision-Language Model for autonomous driving, comprising:
   expanding a first training sample set to obtain a second training sample set, wherein the second training sample set comprises a plurality of image samples annotated with road scene targets;
   inserting a plurality of fine-tuning sub-networks respectively into specified positions in a first large Vision-Language Model to generate a second large Vision-Language Model;
   processing the plurality of image samples in the second training sample set using the second large Vision-Language Model to obtain a target prediction result;
   calculating a loss value using the target prediction result and a target annotation result; and
   preserving parameters of the first large Vision-Language Model unchanged, and updating parameters of the plurality of fine-tuning sub-networks using the loss value.

2. The incremental learning method according to claim 1, wherein the step of expanding the first training sample set to obtain the second training sample set comprises:
   acquiring a first image sample comprising a preset category from the first training sample set;
   processing the first image sample using a generative model to obtain a plurality of second image samples comprising the preset category, wherein the plurality of second image samples are different from the first image sample;
   annotating preset category targets in the plurality of second image samples comprising the preset category to obtain annotated second image samples; and
   forming the second training sample set by all the annotated second image samples.

3. The incremental learning method according to claim 1, wherein each of the plurality of fine-tuning sub-networks comprises a first parameterized hyper-complex multiplication layer, a normalization layer, a second parameterized hyper-complex multiplication layer and a scaling unit, wherein the first parameterized hyper-complex multiplication layer, the normalization layer, the second parameterized hyper-complex multiplication layer and the scaling unit are connected sequentially; the normalization layer uses a softmax function; and the scaling unit is configured to scale an output result from the second parameterized hyper-complex multiplication layer using a preset parameter.

4. The incremental learning method according to claim 3, wherein the first large Vision-Language Model comprises a plurality of first Transformer units, wherein each of the plurality of first Transformer units comprises an encoder and a first decoder, wherein the first decoder comprises: a multi-head attention layer, a first addition and normalization layer, a feed-forward layer, and a second addition and normalization layer; and
   wherein the step of inserting the plurality of fine-tuning sub-networks respectively into the specified positions in the first large Vision-Language Model to generate the second large Vision-Language Model comprises:
      adding a first parallel fine-tuning sub-network for the multi-head attention layer of the first decoder of each of the plurality of the first Transformer units of the first large Vision-Language Model; and
      adding a second parallel fine-tuning sub-network for the feed-forward layer of the first decoder of each of the plurality of the first Transformer units of the first large Vision-Language Model.

5. The incremental learning method according to claim 4, wherein the second large Vision-Language Model comprises a plurality of second Transformer units, wherein each of the plurality of second Transformer units comprises the encoder and a second decoder, wherein the second decoder comprises: the multi-head attention layer, a first fine-tuning sub-network, the first addition and normalization layer, the feed-forward layer, a second fine-tuning sub-network, and the second addition and normalization layer; input data to each of the plurality of second Transformer units enters the multi-head attention layer, the first fine-tuning sub-network, and the first addition and normalization layer, respectively; an output result from the first fine-tuning sub-network enters the first addition and normalization layer; an output result from the first addition and normalization layer enters the feed-forward layer, the second fine-tuning sub-network, and the second addition and normalization layer; and an output result from the second fine-tuning sub-network enters the second addition and normalization layer.

6. The incremental learning method according to claim 1, further comprising:
   acquiring first text information entered by a user;
   determining a target category of a to-be-detected image from a center of the first text information;

generating a question based on the target category, wherein the question comprises a description of the target category;

acquiring second text information entered by the user for the question; and using the second text information as an input to the large Vision-Language Model.

7. An incremental learning apparatus for a large Vision-Language Model for autonomous driving, comprising:

a first processing unit configured to expand a first training sample set to obtain a second training sample set, wherein the second training sample set comprises a plurality of image samples annotated with road scene targets;

a generation unit configured to insert a plurality of fine-tuning sub-networks respectively into specified positions in a first large Vision-Language Model to generate a second large Vision-Language Model;

a second processing unit configured to process the plurality of image samples in the second training sample set using the second large Vision-Language Model to obtain a target prediction result;

a calculation unit configured to calculate a loss value using the target prediction result and a target annotation result; and a fine-tuning unit configured to preserve parameters of the first large Vision-Language Model unchanged, and update parameters of the plurality of fine-tuning sub-networks using the loss value.

8. An electron device, comprising a memory, a processor, and a computer program stored in the memory and executable on the processor, wherein when executing the computer program, the processor implements the incremental learning method according to claim 1.

9. A non-transitory computer readable storage medium, wherein the non-transitory computer readable storage medium stores a computer program, wherein the computer program is executed by a processor to implement the incremental learning method according to claim 1.

10. The electron device according to claim 8, wherein in the incremental learning method, the step of expanding the first training sample set to obtain the second training sample set comprises:

acquiring a first image sample comprising a preset category from the first training sample set;

processing the first image sample using a generative model to obtain a plurality of second image samples comprising the preset category, wherein the plurality of second image samples are different from the first image sample;

annotating preset category targets in the plurality of second image samples comprising the preset category to obtain annotated second image samples; and forming the second training sample set by all the annotated second image samples.

11. The electron device according to claim 8, wherein in the incremental learning method, each of the plurality of fine-tuning sub-networks comprises a first parameterized hyper-complex multiplication layer, a normalization layer, a second parameterized hyper-complex multiplication layer and a scaling unit, wherein the first parameterized hyper-complex multiplication layer, the normalization layer, the second parameterized hyper-complex multiplication layer and the scaling unit are connected sequentially; the normalization layer uses a softmax function; and the scaling unit is configured to scale an output result from the second parameterized hyper-complex multiplication layer using a preset parameter.

12. The electron device according to claim 11, wherein in the incremental learning method, the first large Vision-Language Model comprises a plurality of first Transformer units, wherein each of the plurality of first Transformer units comprises an encoder and a first decoder, wherein the first decoder comprises: a multi-head attention layer, a first addition and normalization layer, a feed-forward layer, and a second addition and normalization layer; and wherein the step of inserting the plurality of fine-tuning sub-networks respectively into the specified positions in the first large Vision-Language Model to generate the second large Vision-Language Model comprises:

adding a first parallel fine-tuning sub-network for the multi-head attention layer of the first decoder of each of the plurality of the first Transformer units of the first large Vision-Language Model; and adding a second parallel fine-tuning sub-network for the feed-forward layer of the first decoder of each of the plurality of the first Transformer units of the first large Vision-Language Model.

13. The electron device according to claim 12, wherein in the incremental learning method, the second large Vision-Language Model comprises a plurality of second Transformer units, wherein each of the plurality of second Transformer units comprises the encoder and a second decoder, wherein the second decoder comprises: the multi-head attention layer, a first fine-tuning sub-network, the first addition and normalization layer, the feed-forward layer, a second fine-tuning sub-network, and the second addition and normalization layer; input data to each of the plurality of second Transformer units enters the multi-head attention layer, the first fine-tuning sub-network, and the first addition and normalization layer, respectively; an output result from the first fine-tuning sub-network enters the first addition and normalization layer; an output result from the first addition and normalization layer enters the feed-forward layer, the second fine-tuning sub-network, and the second addition and normalization layer; and an output result from the second fine-tuning sub-network enters the second addition and normalization layer.

14. The electron device according to claim 8, wherein the incremental learning method further comprises:

acquiring first text information entered by a user;

determining a target category of a to-be-detected image from a center of the first text information;

generating a question based on the target category, wherein the question comprises a description of the target category;

acquiring second text information entered by the user for the question; and using the second text information as an input to the large Vision-Language Model.

15. The non-transitory computer readable storage medium according to claim 9, wherein in the incremental learning method, the step of expanding the first training sample set to obtain the second training sample set comprises:

acquiring a first image sample comprising a preset category from the first training sample set;

processing the first image sample using a generative model to obtain a plurality of second image samples comprising the preset category, wherein the plurality of second image samples are different from the first image sample;

annotating preset category targets in the plurality of second image samples comprising the preset category to obtain annotated second image samples; and forming the second training sample set by all the annotated second image samples.

16. The non-transitory computer readable storage medium according to claim 9, wherein in the incremental learning method, each of the plurality of fine-tuning sub-networks comprises a first parameterized hyper-complex multiplication layer, a normalization layer, a second parameterized hyper-complex multiplication layer and a scaling unit, wherein the first parameterized hyper-complex multiplication layer, the normalization layer, the second parameterized hyper-complex multiplication layer and the scaling unit are connected sequentially; the normalization layer uses a softmax function; and the scaling unit is configured to scale an output result from the second parameterized hyper-complex multiplication layer using a preset parameter.

17. The non-transitory computer readable storage medium according to claim 16, wherein in the incremental learning method, the first large Vision-Language Model comprises a plurality of first Transformer units, wherein each of the plurality of first Transformer units comprises an encoder and a first decoder, wherein the first decoder comprises: a multi-head attention layer, a first addition and normalization layer, a feed-forward layer, and a second addition and normalization layer; and wherein the step of inserting the plurality of fine-tuning sub-networks respectively into the specified positions in the first large Vision-Language Model to generate the second large Vision-Language Model comprises:

adding a first parallel fine-tuning sub-network for the multi-head attention layer of the first decoder of each of the plurality of the first Transformer units of the first large Vision-Language Model; and adding a second parallel fine-tuning sub-network for the feed-forward layer of the first decoder of each of the plurality of the first Transformer units of the first large Vision-Language Model.

18. The non-transitory computer readable storage medium according to claim 17, wherein in the incremental learning method, the second large Vision-Language Model comprises a plurality of second Transformer units, wherein each of the plurality of second Transformer units comprises the encoder and a second decoder, wherein the second decoder comprises: the multi-head attention layer, a first fine-tuning sub-network, the first addition and normalization layer, the feed-forward layer, a second fine-tuning sub-network, and the second addition and normalization layer; input data to each of the plurality of second Transformer units enters the multi-head attention layer, the first fine-tuning sub-network, and the first addition and normalization layer, respectively; an output result from the first fine-tuning sub-network enters the first addition and normalization layer; an output result from the first addition and normalization layer enters the feed-forward layer, the second fine-tuning sub-network, and the second addition and normalization layer; and an output result from the second fine-tuning sub-network enters the second addition and normalization layer.

19. The non-transitory computer readable storage medium according to claim 9, wherein the incremental learning method further comprises:

acquiring first text information entered by a user;

determining a target category of a to-be-detected image from a center of the first text information;

generating a question based on the target category, wherein the question comprises a description of the target category;

acquiring second text information entered by the user for the question; and using the second text information as an input to the large Vision-Language Model.

\* \* \* \* \*